US012184556B2

(12) United States Patent
Wang et al.

(10) Patent No.: US 12,184,556 B2
(45) Date of Patent: Dec. 31, 2024

(54) FLOW CONTROL METHOD

(71) Applicant: National Yang Ming Chiao Tung University, Hsinchu (TW)

(72) Inventors: Shie-Yuan Wang, Hsinchu (TW);
Yo-Ru Chen, Zhubei (TW);
Hsien-Chueh Hsieh, Taoyuan (TW);
Ruei-Syun Lai, Kaohsiung (TW);
Yi-Bing Lin, Hsinchu (TW)

(73) Assignee: National Yang Ming Chiao Tung University, Hsinchu (TW)

( * ) Notice: Subject to any disclaimer, the term of this patent is extended or adjusted under 35 U.S.C. 154(b) by 365 days.

(21) Appl. No.: 17/823,828

(22) Filed: Aug. 31, 2022

(65) Prior Publication Data
US 2023/0336487 A1 Oct. 19, 2023

(30) Foreign Application Priority Data

Apr. 15, 2022 (TW) .................................. 111114406

(51) Int. Cl.
*H04L 47/2441* (2022.01)
*H04L 47/30* (2022.01)

(52) U.S. Cl.
CPC .......... *H04L 47/2441* (2013.01); *H04L 47/30* (2013.01)

(58) Field of Classification Search
CPC ............................ H04L 47/2441; H04L 47/30
See application file for complete search history.

(56) References Cited

U.S. PATENT DOCUMENTS

| 7,274,660 | B2 | 9/2007 | Hill et al. | |
| 10,498,656 | B2* | 12/2019 | Sinha | H04L 49/50 |
| 2006/0092845 | A1* | 5/2006 | Kwan | H04L 47/50 |
| | | | | 370/235 |
| 2015/0109928 | A1* | 4/2015 | Yang | H04L 47/627 |
| | | | | 370/235 |
| 2015/0215224 | A1 | 7/2015 | Pandit | |

(Continued)

FOREIGN PATENT DOCUMENTS

| CN | 113132246 A | 7/2021 |
| EP | 2911352 A2 | 8/2015 |

OTHER PUBLICATIONS

C. Li and E. Modiano, "Receiver-Based Flow Control for Networks in Overload," IEEE/ACM Transactions on Networking, 23(2), pp. 616-630, 2015.

(Continued)

*Primary Examiner* — Benjamin M Thieu
(74) *Attorney, Agent, or Firm* — Michael Best & Friedrich LLP

(57) ABSTRACT

A method includes: sending a pause frame followed by a migrate frame when a value of one of per-flow buffer usage (FBU) counters (referred to as a counter value) exceeds a pause threshold; stopping dequeuing one of pause egress queues (PEQs) when receiving a pause frame; enqueuing a packet into one of the PEQs when receiving a migrate frame; sending a resume frame followed by a migrate-back frame when a previous counter value exceeds the pause threshold and a current counter value is smaller than a resume threshold; when receiving a resume frame, resuming dequeuing one of the PEQs until empty, and then dequeuing a default egress queue (DEQ); and enqueuing a packet into the DEQ when receiving a migrate-back frame.

8 Claims, 4 Drawing Sheets

(56) References Cited

U.S. PATENT DOCUMENTS

2016/0248690 A1    8/2016    Banavalikar et al.
2021/0006502 A1    1/2021    Zhou et al.
2021/0320866 A1   10/2021    Le et al.

OTHER PUBLICATIONS

P. Goyal et al., "Backpressure Flow Control," arXiv: 1909.09923v4 [cs.NI], pp. 1-26, 2021.

T. E. Anderson et al., "High-Speed Switch Scheduling for Local-Area Networks," ACM Transactions on Computer Systems (TOCS), 11(4), pp. 319-352, 1993.

H. T. Kung and R. Morris, "Credit-Based Flow Control for ATM Networks," IEEE Network, 9(2), pp. 40-48, 1995.

W. Cheng et al., "Re-architecting Congestion Management in Lossless Ethernet," 17th USENIX Symposium on Networked Systems Design and Implementation (NSDI '20), pp. 19-36, 2020.

Y. Zhu et al., "Congestion Control for Large-Scale RDMA Deployments," ACM SIGCOMM Computer Communication Review, 45(4), pp. 523-536, 2015.

Y. Li et al., "HPCC: High Precision Congestion Control," Proceedings of the ACM Special Interest Group on Data Communication, pp. 44-58, 2019.

S. Hu et al., "Tagger: Practical PFC Deadlock Prevention in Data Center Networks," Proceedings of the 13th International Conference on emerging Networking Experiments and Technologies, pp. 451-463, 2017.

K. Qian et al., "Gentle Flow Control: Avoiding Deadlock in Lossless Networks," Proceedings of the ACM Special Interest Group on Data Communication, pp. 75-89, 2019.

\* cited by examiner

FLOW CONTROL METHOD

CROSS-REFERENCE TO RELATED APPLICATION

This application claims priority of Taiwanese Invention Patent Application No. 111114406, filed on Apr. 15, 2022.

FIELD

The disclosure relates to a flow control method for managing data flows on a computer network based on a per-hop per-flow flow control scheme.

BACKGROUND

In order to prevent packet losses due to buffer overflow, IEEE 802.3x proposed a per-hop link-based flow control scheme. In brief, when it is determined that a value recorded by a buffer counter of a network switch is greater than a pause threshold, the network switch sends a pause packet to an upstream node of the network switch so as to make the upstream node temporarily stop outputting packets that belong to all data flows on a link (communication channel) that connects the upstream node and the network switch. However, such an approach leads to issues of low link utilization and unfair resource allocation among the data flows.

Further, IEEE 802.1Qbb proposed a priority-based flow control (PFC) scheme. To implement features of Quality-of-Service (QoS), a network switch supporting the PFC scheme includes eight ingress queues that respectively correspond to eight priority levels which respectively correspond to eight values of Class of Service (CoS), and eight buffer counters that respectively correspond to the eight priority levels. When it is determined that a value recorded by one of the buffer counters is greater than a threshold, the network switch sends a pause packet to an upstream node of the network switch so as to make the upstream node temporarily stop outputting packets that belong to data flow(s) corresponding to one of the priority levels which corresponds to the one of the buffer counters. However, in a scenario where a small data flow and a large data flow both correspond to the same one of the priority levels and share the same one of the ingress queues, outputting packets that belong to the small data flow may be unnecessarily stopped when the large data flow causes a pause on outputting packets that belong to the same one of the priority levels. Therefore, an issue of victim flow arises. Moreover, the PFC scheme has problems of congestion spreading and circular wait deadlock.

SUMMARY

Therefore, an object of the disclosure is to provide a flow control method for managing packet flow on a computer network and capable of alleviating at least one of the drawbacks of the prior art.

According to the disclosure, the flow control method is adapted to be implemented by a network device that is configured to process a plurality of data flows and that communicates with at least one upstream node and at least one downstream node. The network device receives packets from the at least one upstream node and forwards the packets to the at least one downstream node. Each of the packets belongs to one of the data flows. The network device includes a plurality of per-flow buffer usage (FBU) counters that respectively correspond to the data flows, a default egress queue (DEQ), and a plurality of pause egress queues (PEQs). The DEQ and the PEQs respectively correspond to a plurality of priority levels. The flow control method includes steps of:

for each of the FBU counters, repeatedly obtaining a value that is recorded by the FBU counter and that indicates a total of packet sizes of packets which belong to one of the data flows that corresponds to the FBU counter, which are enqueued into one of the DEQ and the PEQs and which are not yet transmitted to the at least one downstream node;

for each of the FBU counters, when it is determined that the value of the FBU counter is greater than a per-flow pause threshold, sending a first transmitted pause frame followed by a first transmitted migrate frame to one of the at least one upstream node that is outputting one of the data flows which corresponds to the FBU counter, the first transmitted migrate frame indicating a flow identifier (FID) that corresponds to the one of the data flows which corresponds to the FBU counter, the first transmitted pause frame indicating a first indicated one of the priority levels that corresponds to the one of the data flows which corresponds to the FBU counter, and a first pause duration that corresponds to the first indicated one of the priority levels;

when it is determined that an incoming packet received from, the at least one downstream node is a first received pause frame, according to a second pause duration and a second indicated one of the priority levels indicated by the first received pause frame, stopping dequeuing one of the PEQs that corresponds to the second indicated one of the priority levels for the second pause duration;

when it is determined that an incoming packet received from the at least one downstream node is a first received migrate frame, according to an FID indicated by the first received migrate frame, enqueuing a to-be-forwarded packet that belongs to one of the data flows which corresponds to the FID indicated by the first received migrate frame into one of the PEQs that corresponds to one of the priority levels which corresponds to the one of the data flows that corresponds to the FID, rather than enqueuing the to-be-forwarded packet into the DEQ;

for each of the FBU counters, when it is determined that a previous value of the FBU counter was greater than the per-flow pause threshold and a current value of the FBU counter is smaller than a per-flow resume threshold, sending a first transmitted resume frame followed by a first transmitted migrate-back frame to one of the at least one upstream node that is outputting one of the data flows which corresponds to the FBU counter, the first transmitted resume frame indicating one of the priority levels that corresponds to the one of the data flows which corresponds to the FBU counter, the first transmitted migrate-back frame indicating an FID that corresponds to the one of the data flows which corresponds to the FBU counter;

when it is determined that an incoming packet received from the at least one downstream node is a first received resume frame that indicates one of the priority levels, resuming dequeuing one of the PEQs that corresponds to the one of the priority levels until the one of the PEQs is empty, and then dequeuing the DEQ; and when it is determined that an incoming packet received from the at least one downstream node is a first received migrate-back frame, according to an FID indicated by the first received migrate-back frame, enqueuing into the DEQ a to-be-forwarded packet that belongs to one of the data flows which corresponds to the FID indicated by the first received migrate-back frame, rather than enqueuing the to-be-forwarded packet into one of the PEQs.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
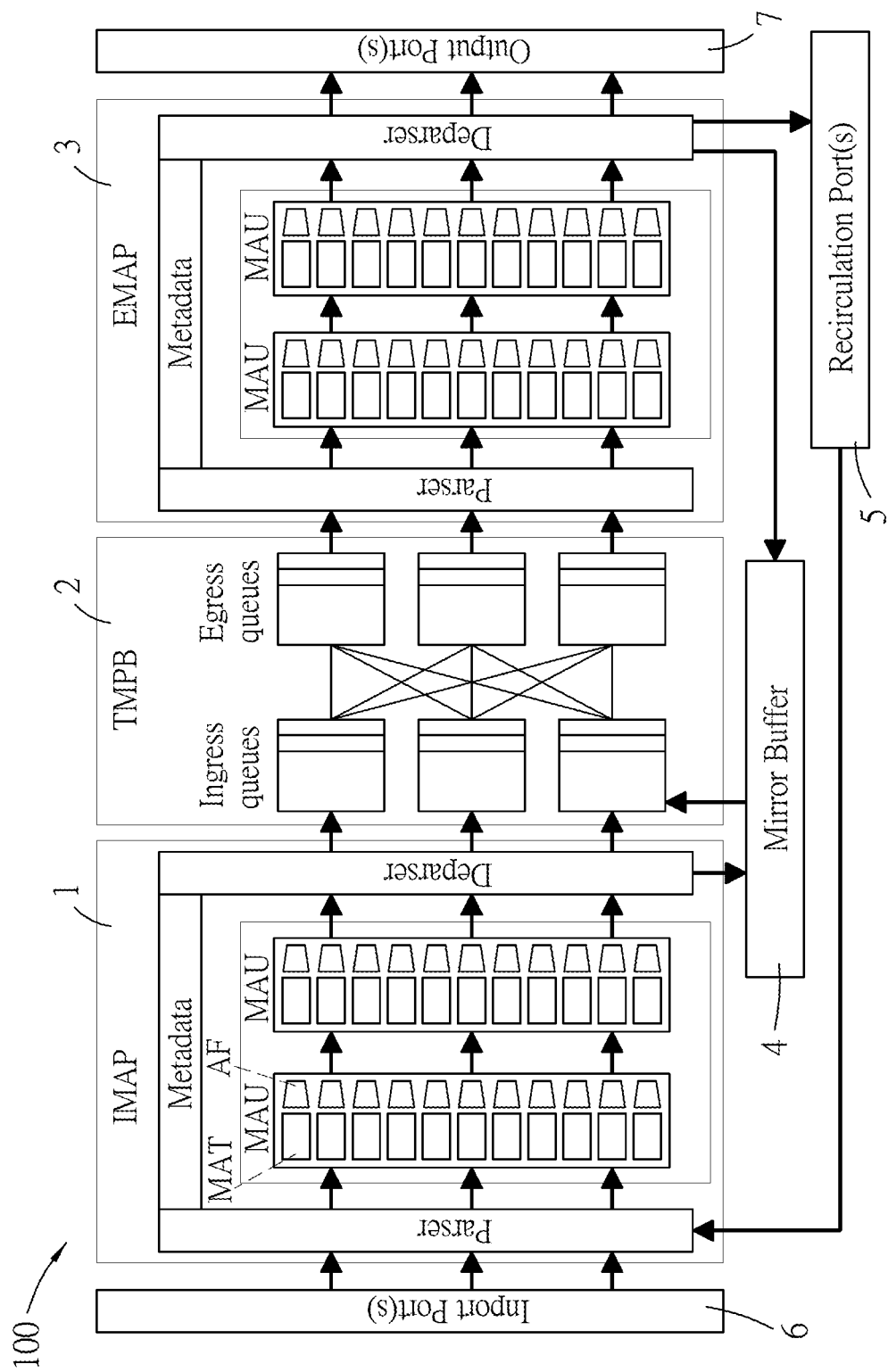
FIG. 1 is a block diagram illustrating an example of a network device according to an embodiment of the disclosure.
Figure 2:
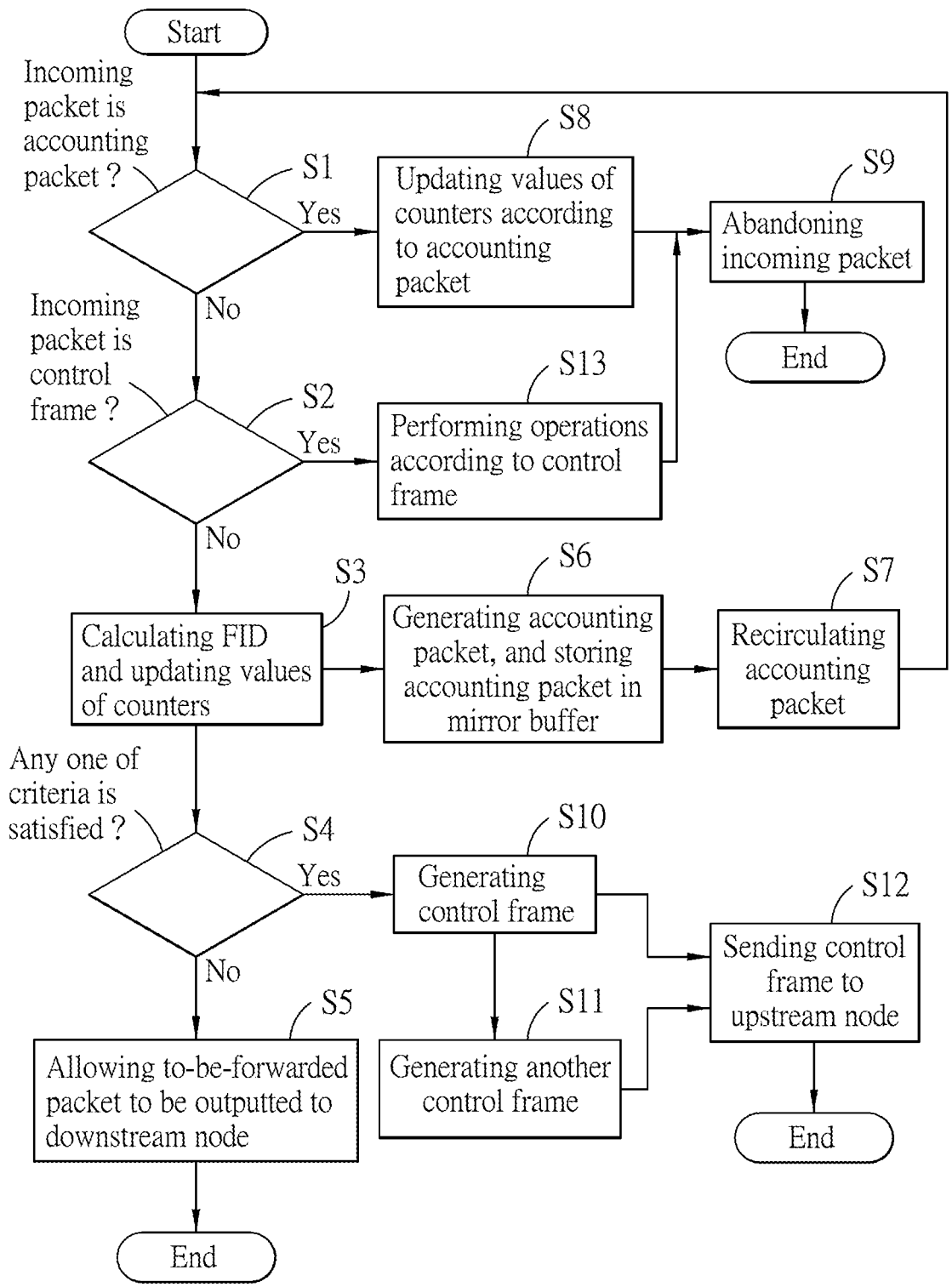
FIG. 2 is a flow chart illustrating a flow control method for managing data flows on a computer network according to an embodiment of the disclosure.

Referring to FIG. 1, an embodiment of a network device 100 that is used to implement a flow control method for managing data flows on a computer network according to the disclosure is shown. The network device 100 may be a network switch, a router, a network interface controller or the like, but is not limited thereto. In this embodiment, the network device 100 is implemented to be a network switch using P4 (programming protocol-independent packet processors) programming language, which is a programmable data plane technology allowing developers to design and realize packet processing logics in a data plane of the computer network.

The network device 100 communicates with at least one upstream node and at least one downstream node, and is configured to process a plurality of data flows. Similar to the network device 100, each of the at least one upstream node and the at least one downstream node may be a network switch, a router, a network interface controller or the like, but is not limited thereto. The network device 100 receives packets from the at least one upstream node and forwards the packets to the at least one downstream node. Each of the packets belongs to one of the data flows.

The network device 100 includes an ingress match-action pipeline (IMAP) module 1, a traffic manager and packet buffer (TMPB) module 2, an egress match-action pipeline (EMAP) module 3, a mirror buffer 4, a recirculation port 5, at least one input port 6, at least one output port 7, a packet buffer usage (PBU) counter (not shown), and a plurality of per-flow buffer usage (FBU) counters (not shown). The FBU counters respectively correspond to the data flows.

In brief, after a to-be-forwarded packet is received via the input port(s) 6, the to-be-forwarded packet will be sequentially processed by the IMAP module 1, the TMPB module 2 and the EMAP module 3, and then outputted via the output port(s) 7.

The TMPB module 2 is configured to provide scheduling functions for carrying out specific functionalities of this disclosure. The TMPB module 2 includes, for each of the at least one output port 7, a default egress queue (DEQ) and a plurality of pause egress queues (PEQs). The DEQ and the PEQs respectively correspond to a plurality of priority levels. It is worth to note that each of the DEQ and PEQs may be referred to as an ingress queue from the perspective of the TMPB module 2 receiving packets from the IMAP module 1.

In this embodiment, the number of PEQs for each output port 7 is seven (i.e., the number of the ingress queues is eight), and the number of the priority levels is eight. The priority levels arranged in descending order are "p0", "p1", "p2", "p3", "p4", "p5", "p6" and "p7", which respectively correspond to the DEQ and the PEQs. That is to say, the DEQ corresponds to a highest one of the priority levels "p0", and the PEQs respectively correspond to remaining lower ones of the priority levels "p1", "p2", "p3", "p4", "p5", "p6" and "p7". It should be noted that the DEQ and any one of the PEQs cannot correspond to the same one of the priority levels at the same time. The number of each of the DEQ and the PEQs is not limited to what are disclosed herein.

In one embodiment, a set of the DEQ and the PEQs and the priority levels are in a many-to-one corresponding relationship (i.e., one or more of the DEQ and the PEQs may correspond to the same one of the priority levels). In other words, the ingress queues and the priority levels are in a many-to-one corresponding relationship (i.e., one or more of the ingress queues may correspond to the same one of the priority levels).

In one embodiment, the TMPB module 2 includes a plurality of DEQs for each output port 7. For example, the TMPB module 2 includes, for each output port 7, two DEQs and fourteen PEQs. The two DEQs both correspond to the priority level "p0", and the fourteen PEQs respectively correspond to the priority levels "p1", "p1", "p2", "p2", "p3", "p3", "p4", "p4", "p5", "p5", "p6", "p6", "p7" and "p7".

Each of the IMAP module 1 and the EMAP module 3 includes a parser, a plurality of match-action units (MAUs) and a deparser. The parser is configured to divide each incoming packet to obtain a header of the incoming packet, to extract information contained in the header of the incoming packet, and to pass the incoming packet to the MAUs. Each of the MAUs is realized by a set of match-action tables (MATs) and action functions (AFs). The MATs are defined by a set of match keys (e.g., information contained in a header of a packet, or an instance of intrinsic metadata that is used for matching and that is assigned by the network device 100 to a packet), and the AFs are operations to be applied to a packet. Each of the MAUs is configured to process the incoming packet based on the MATs. The deparser is configured to reassemble the incoming packet processed by the MAU, and to transfer the incoming packet to the TMPB module 2.

It is worth to note that intrinsic metadata is a data structure that is used to describe a current state of a packet or to specify an operation to be applied to a packet. For example, for each incoming packet, the IMAP module 1 is configured to generate an instance of intrinsic metadata so as to assign to the incoming packet an output port ID of one of the at least one output port 7, and an egress queue ID of one of the DEQ and the PEQs. The incoming packet will be enqueued into one of the DEQ and the PEQs for being outputted via said one of the at least one output port 7 based on the output port ID and the egress queue ID.

The IMAP module 1 is further configured to determine, for an incoming packet, an FID (flow identifier) of an incoming one of the data flows to which the incoming packet belongs by calculating, based on 5-tuple information contained in the header of the incoming packet, a hash value to serve as the FID. The 5-tuple information includes a source IP address, a source port number, a destination IP address, a destination port number, and a value related to a protocol type. The FID is a non-negative integer that uniquely represents one of the data flows. The IMAP module 1 is further configured to map the FID to one of the PEQs by performing modulo operation on the FID with the FID being the dividend and the number of the PEQs being the divisor (i.e., the divisor is seven in this embodiment). The remainder obtained from the modulo operation is an integer ranging from zero to six and corresponding to one of the PEQs. The reminders of zero to six respectively correspond to the priority levels "p1", "P2", "p3", "p4", "p5", "p6" and "p7"; that is to say, each of the data flows corresponds to one of the priority levels based on the FID thereof.

It should be noted that each of the IMAP module 1, the TMPB module 2 and the EMAP module 3 may be implemented by one of hardware, firmware, software, and any combination thereof. In particular, the above-mentioned modules may be embodied in: executable software as a set of logic instructions stored in a machine- or computer-readable storage medium of a memory such as random, access memory (RAM), read only memory (ROM), programmable ROM (PROM), firmware, flash memory, etc.; configurable logic such as programmable logic arrays (PLAs), field programmable gate arrays (FPGAs), complex programmable logic devices (CPLDs), etc.; fixed-functionality logic hardware using circuit technology such as application specific integrated circuit (ASIC), complementary metal oxide semiconductor (CMOS), transistor-transistor logic (TTL) technology, etc.; or any combination thereof. For example, the IMAP module 1, the TMPB module 2 and the EMAP module 3 may be implemented to be software modules in a program, where the software modules contain codes and instructions to carry out specific functionalities, and can be called individually or together to fulfill functionalities of the network device 100 of this disclosure.

The mirror buffer 4 may be implemented by random access memory (RAM), double data rate synchronous dynamic random access memory (DDR SDRAM), read only memory (ROM), programmable ROM (PROM), flash memory, a hard disk drive (HDD), a solid state disk (SSD), electrically-erasable programmable read-only memory (EEPROM) or any other volatile/non-volatile memory devices, but is not limited thereto.

Each of the PBU counter and the FBU counters is implemented by a register array that is realized by static random access memory (SRAM). The PBU counter has 32 bits. For each of the data flows, an FBU counter having 32 bits is allocated.

When it is determined that an incoming packet is a to-be-forwarded packet, the IMAP module 1 is configured to update a value of one of the FBU counters that corresponds to a target one of the data flows (hereinafter referred to as the "target data flow") by adding a packet size of the to-be-forwarded packet to the value of the one of the FBU counters (hereinafter referred to as the "target FBU counter"), and to update a value of the PBU counter by adding the packet size of the to-be-forwarded packet to the value of the PBU counter. The value of each of the FBU counters and the PBU counter may vary over time; that is to say, the value is a real-time value.

In order to update the values of the target FBU counter and the PBU counter for the to-be-forwarded packet that belongs to the target data flow and that has been outputted by the network device 100, the EMAP module 3 is configured to generate and send an accounting packet to the IMAP module in a recirculating manner so as to comply with hardware constraints of the network switch using P4 programming language. The recirculating manner is specified in the following.

Whenever the EMAP module 3 outputs the to-be-forwarded packet, the EMAP module 3 is configured to make a cloned copy of the to-be-forwarded packet thus outputted, to truncate the cloned copy by removing packet payload of the cloned copy to obtain a truncated copy serving as the accounting packet, and to store the accounting packet in the mirror buffer 4. The accounting packet indicates a packet size of the to-be-forwarded packet thus outputted and an FID that corresponds to the target data flow to which the to-be-forwarded packet thus outputted belongs. Subsequently, the TMPB module 2 is configured to retrieve the accounting packet from the mirror buffer 4 and send the accounting packet to the EMAP module 3. Then, the EMAP module 3 is configured to send the accounting packet via the recirculation port 5 to the IMAP module 1. It is worth to note that in one embodiment, the network device 100 may include a plurality of the recirculation ports 5.

When the IMAP module 1 receives an incoming packet and determines that the incoming packet is the accounting packet, the IMAP module 1 is configured to update the value of the target FBU counter by subtracting the packet size indicated by the accounting packet from the value of the target FBU counter, and to update the value of the PBU counter by subtracting the packet size indicated by the accounting packet from the value of the PBU counter.

Further, based on a variety of conditions of usage of each of the PBU counter and the FBU counters determined by the TMPB module 2, the EMAP module 3 is configured to generate and send a control frame to the at least one upstream node for adjusting transmission of to-be-forwarded packets that belong to the data flows. The control frame may be one of a pause frame, a migrate frame, a resume frame and a migrate-back frame. It should be noted that the control frame is a packet.

Specifically, for each of the FBU counters, the TMPB module 2 is configured to repeatedly obtain the value recorded by the FBU counter and indicating a total of packet sizes of packets that belong to one of the data flows which corresponds to the FBU counter (hereinafter referred to as the "FBU-corresponding data flow"), that are enqueued into one of the DEQ and the PEQs and that are not yet transmitted to the at least one downstream node. The TMPB module 2 is configured to determine whether a currently-obtained value of the FBU counter is greater than a per-flow pause threshold ($Xoff_f$). When it is determined that the currently-obtained value of the FBU counter is not greater than the per-flow pause threshold ($Xoff_f$), the TMPB module 2 is configured to enqueue into the DEQ a to-be-forwarded packet that belongs to the FBU-corresponding data flow. On the other hand, when it is determined that the currently-obtained value of the FBU counter is greater than the per-flow pause threshold ($Xoff_f$), the EMAP module 3 is configured to generate and send a first transmitted pause frame followed by a first transmitted migrate frame to one of the at least one upstream node that is outputting the FBU-corresponding data flow. The first transmitted pause frame indicates a first indicated one of the priority levels that corresponds to the FBU-corresponding data flow, and a first pause duration that corresponds to the first indicated one of the priority levels. The first transmitted migrate frame indicates an FID that corresponds to the FBU-corresponding data flow. When it is determined, after the TMPB module 2 had previously determined that the value of the FBU counter was greater than the per-flow pause threshold ($Xoff_f$), that a newly-obtained value of the FBU counter is smaller than a per-flow resume threshold ($Xon_f$) that is smaller than the per-flow pause threshold ($Xoff_f$), the EMAP module 3 is configured to generate and send a first transmitted resume frame followed by a first transmitted migrate-back frame to one of the at least one upstream node that is outputting the FBU-corresponding data flow. The first transmitted resume frame indicates the one of the priority levels that corresponds to the FBU-corresponding data flow. The first transmitted migrate-back frame indicates the FID that corresponds to the FBU-corresponding data flow.

Additionally, the TMPB module 2 is configured to repeatedly obtain the value that is recorded by the PBU counter and that indicates a total of packet sizes of packets enqueued. The TMPB module 2 is configured to determine whether a currently-obtained value of the PBU counter is greater than a system buffer pause threshold ($Xoff_s$).

When it is determined that the currently-obtained value of the PBU counter is greater than the system buffer pause threshold ($Xoff_s$), the EMAP module 3 is configured to generate and send a second transmitted pause frame followed by a plurality of second transmitted migrate frames to each of the at least one upstream node that is outputting the data flows. The second transmitted pause frame indicates all of the priority levels and a plurality of first pause durations that respectively correspond to the priority levels. The second transmitted migrate frames indicate FIDs that correspond respectively to the data flows.

When it is determined, after the TMPB module 2 had previously determined that the value of the PBU counter was greater than the system buffer pause threshold ($Xoff_s$), that a newly-acquired value of the PBU counter is smaller than a system buffer resume threshold ($Xon_s$) that is smaller than the system buffer pause threshold ($Xoff_s$), the EMAP module 3 is configured to generate and send a second transmitted resume frame followed by a plurality of second transmitted migrate-back frames to each of the at least one upstream node that is outputting the data flows. The second transmitted resume frame indicates the priority levels that correspond respectively to the data flows. The second transmitted migrate-back frames respectively indicate the FIDs of the data flows.

In response to receipt of a control frame (i.e., the pause frame, the migrate frame, the resume frame or the migrate-back frame) from the at least one downstream node, the TMPB module 2 is configured to perform operations on the DEQ and the PEQs to control transmission of to-be-forwarded packets that are related to the data flows.

Specifically, when it is determined that an incoming packet received from the at least one downstream node is a first received pause frame, according to a second pause duration and a second indicated one of the priority levels indicated by the first received pause frame, the TMPB module 2 is configured to stop dequeuing one of the PEQs that corresponds to the second indicated one of the priority levels for the second pause duration.

When it is determined that an incoming packet received from the at least one downstream node is a received migrate frame, according to an FID indicated by the received migrate frame, the TMPB module 2 is configured to enqueue a to-be-forwarded packet that belongs to one of the data flows that corresponds to the FID indicated by the received migrate frame (hereinafter referred to as the "FID-indicated data flow") into one of the PEQs that corresponds to one of the priority levels which corresponds to the FID-indicated data flow, rather than enqueuing the to-be-forwarded packet into the DEQ.

When it is determined that an incoming packet received from the at least one downstream node is a received resume frame that indicates one of the priority levels, the TMPB module 2 is configured to resume dequeuing one of the PEQs that corresponds to said one of the priority levels until the one of the PEQs is empty, and then to dequeue the DEQ.

When it is determined that an incoming packet received from the at least one downstream node is a received migrate-back frame, according to an FID indicated by the received migrate-back frame, the TMPB module 2 is configured to enqueue into the DEQ a to-be-forwarded packet that belongs to one of the data flows which corresponds to the FID indicated by the received migrate-back frame, rather than enqueuing the to-be-forwarded packet into one of the PEQs.

When it is determined that an incoming packet received from the at least one downstream node is a second received pause frame that indicates all of the priority levels and a plurality of second pause durations respectively corresponding to the priority levels, the TMPB module 2 is configured to stop dequeuing the DEQ and the PEQs respectively for the plurality of second pause durations that correspond respectively to the priority levels to which the DEQ and the PEQs respectively correspond (i.e., each of the DEQ and the PEQs and the respective second pause duration correspond to the same priority level).

Figure 3:
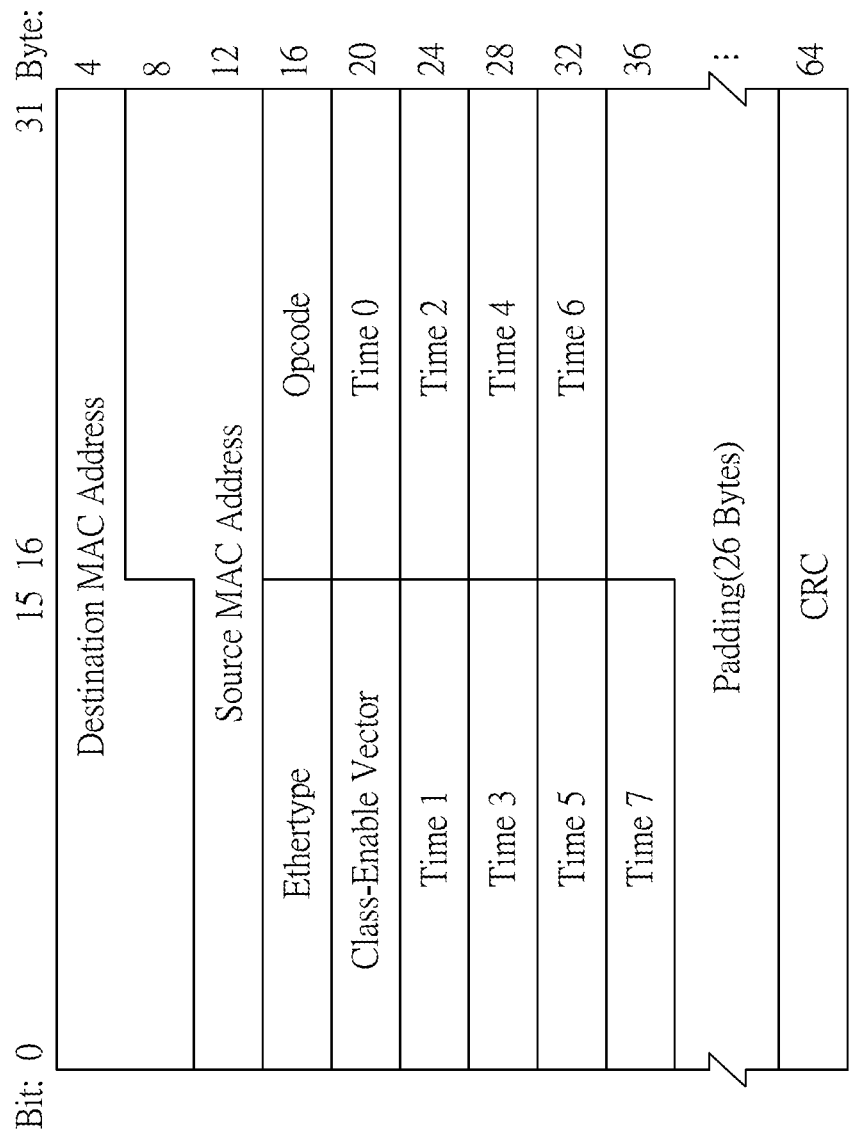
FIG. 3 is a schematic diagram illustrating a format of a pause frame and a resume frame according to an embodiment of the disclosure.

Referring to FIG. 3, a format of each of the pause frame (i.e., the first/second transmitted/received pause frame) and the resume frame (i.e., the first/second transmitted resume frame or the received resume frame) is illustrated. It is worth to note that the format of the pause frame and the resume frame complies with that of a pause frame used in a priority-based flow control (PFC) scheme proposed in IEEE 802.1Qbb. Each of the pause frame and the resume frame indicates eight pause durations (in fields "Time 0", "Time 1", "Time 2", "Time 3", "Time 4", "Time 5", "Time 5", "Time 6" and "Time 7") that respectively correspond to the priority levels (i.e., the priority levels "p0", "p1", "p2", "p3", "p4", "p5", "p6" and "p7"), and contains a class-enable vector (in a field "Class-Enable Vector") that indicates one of the priority levels. Each of the pause durations is represented by 16 bits of binary digits, and the class-enable vector is also represented 16 bits of binary digits. In particular, the first to eighth bits (i.e., bit 0, bit 1, bit 2, bit 3, bit 4, bit 5, bit 6 and bit 7) of the class-enable vector respectively correspond to the DEQ and the PEQs, which, as previously mentioned, respectively correspond to the priority levels "p0", "p1", "P2", "p3", "p4", "p5", "p6" and "p7". It is worth to note that a unit of pause duration (i.e., a quanta time, which is equal to 512 bit time) is 51.2 nanoseconds for a 10 Gbps network card and 512 nanoseconds for a 1 Gbps network card. That is to say, for the 10 Gbps network card, a value of one indicates a pause duration of 51.2 nanoseconds, a value of two indicates a pause duration of 102.4 nanoseconds, and so on.

For example, each of the first transmitted pause frame and the first received pause frame indicates eight pause durations that respectively correspond to the eight priority levels, the first transmitted pause frame contains the class-enable vector that indicates the first indicated one of the priority levels, and the first received pause frame contains the class-enable vector that indicates the second indicated one of the priority levels.

For example, in order to stop dequeuing one of the PEQs which corresponds to the priority level "p1" and to which an FID having a value of "0b 0000000000000000" (which is zero in a decimal number system) is mapped, the EMAP module 3 would generate the first transmitted pause frame that contains a class-enable vector having a value of "0b 0000000000000010" (which is two in the decimal number system) and that indicates a desired pause duration (e.g., 3.4 milliseconds) in the field "Time 1". Contrarily, in order to resume dequeuing one of the PEQs which corresponds to the priority level "p1" and to which the FID having a value of "0b 0000000000000000" is mapped, the EMAP module 3 would generate the transmitted resume frame that contains a class-enable vector having a value of "0b 0000000000000010" and that indicates a pause duration of zero seconds in the field "Time 1".

For example, in response to receipt of the received resume frame that contains a class-enable vector having a value of "0b 0000000000000010" and that indicates a pause duration of zero seconds in the field "Time 1", the TMPB module 2 resumes dequeuing one of the PEQs that corresponds to the priority level "p1" until the one of the PEQs is empty, and then to dequeue the DEQ.

For example, in order to stop dequeuing one of the PEQs which corresponds to the priority level "p4" and to which an FID having a value of "0b 0000000000011111" (which is 31 in the decimal number system) is mapped, the EMAP module 3 would generate the first transmitted pause frame that contains a class-enable vector having a value of "0b 0000000000010000" (which is 16 in the decimal number system) and that indicates a desired pause duration (e.g., 51.2 nanoseconds) in the field "Time 4".

For example, in order to stop dequeuing all of the DEQ and the PEQs, each of the second transmitted pause frame and the second received pause frame contains a class-enable vector having a value of "0b 0000000011111111" (which corresponds to 255 in the decimal number system), and indicates pause durations in the fields "Time 0", "Time 1", "Time 2", "Time 3", "Time 4", "Time 5", "Time 5", "Time 6" and "Time 7" respectively for the DEQ and the PEQs.

Figure 4:
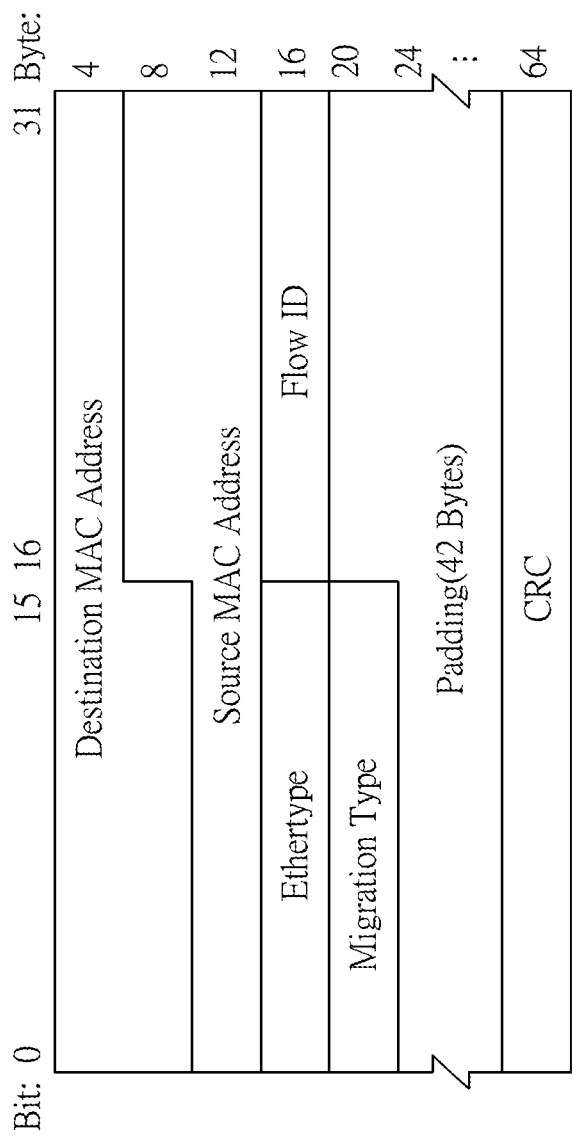
FIG. 4 is a schematic diagram illustrating a format of a migrate frame and a migrate-back frame according to an embodiment of the disclosure.

Referring to FIG. 4, a format of each of the migrate frame (i.e., the first/second transmitted migrate frame or the received migrate frame) and the migrate-back frame (i.e., the first/second transmitted migrate-back frame or the received migrate-back frame) is illustrated. Each of the migrate frame and the migrate-back frame contains data related to migration type (hereinafter referred to as the "migration-related data") in a field "Migration Type" for the network device 100 to recognize the migrate frame and the migrate-back frame, and indicates an FID that uniquely represents a single one of the data flows. For each of the migrate frame and the migrate-back frame, the FID indicated thereby and the migration-related data are represented by 16 bits of binary digits.

It is worth to note that in order to comply with the hardware constraints of the network switch using P4 programming language, after generating the control frame, the EMAP module 3 stores the control frame in the mirror buffer 4. Thereafter, the TMPB module 2 retrieves the control frame stored in the mirror buffer 4, and sends the control frame to the EMAP module 3 for outputting the control frame to the at least one upstream node via the at least one output port 7.

The flow control method includes steps S1 to S13 delineated below.

In step S1, the IMAP module 1 determines whether an incoming packet is the accounting packet. When it is determined that the incoming packet is the accounting packet, a procedure flow of the method proceeds to step S8. Otherwise, the procedure flow proceeds to step S2.

In step S2, the IMAP module 1 determines whether the incoming packet is the control frame (i.e., the pause frame, the migrate frame, the resume frame or the migrate-back frame). When it is determined that the incoming packet is the control frame, the procedure flow proceeds to step S13. Otherwise, the procedure flow proceeds to step S3.

In step S3, the IMAP module 1 determines that the incoming packet is a to-be-forwarded packet, and calculates, for the incoming packet, an FID of a target one of the data flows to which the incoming packet belongs (hereinafter referred to as the "target data flow"). In addition, the IMAP module 1 updates a value of the PBU counter and a value of one of the FBU counters that corresponds to the target data flow by adding a packet size of the to-be-forwarded packet to both of the values. Then, the procedure flow proceeds to steps S4 and S6.

It is worth to note that since the control frame and the accounting frame would not be enqueued into the DEQ or any one of the PEQs, the IMAP module 1 does not calculate an FID for either of the control frame and the accounting frame based on information contained in a header thereof.

In step S4, the TMPB module 2 determines whether any one of criteria that are related to usage of the DEQ and the PEQs recorded by the PBU counter and the FBU counters is satisfied. The criteria include a first condition that a value of one of the FBU counters is greater than the per-flow pause threshold ($Xoff_f$), a second condition that a previously value of one of the FBU counters was greater than the per-flow pause threshold ($Xoff_f$) and then a current value of the one of the FBU counters is now smaller than the per-flow resume threshold ($Xon_f$), a third condition that a value of the PBU counter is greater than the system buffer pause threshold ($Xoff_s$), and a fourth condition that a previous value of the PBU counter was greater than the system buffer pause threshold ($Xoff_s$) and then a current value of the PBU counter is smaller than the system buffer resume threshold ($Xon_s$). When it is determined that none of the criteria is satisfied, the procedure flow proceeds to step S5. Otherwise, when it is determined that one of the criteria is satisfied, the procedure flow proceeds to step S10.

In step S5, the network device 100 allows the to-be-forwarded packet to pass through the TMPB module 2 (particularly, through the DEQ of the TMPB module 2) and the EMAP module 3 so as to be outputted via one of the at least one output port 7 to one of the at least one downstream node.

In step S6, the EMAP module 3 generates the accounting packet for the to-be-forwarded packet, and stores the accounting packet in the mirror buffer 4. The accounting packet indicates a packet size of the to-be-forwarded packet and the FID that corresponds to the target data flow to which the to-be-forwarded packet belongs. Then, the procedure flow proceeds to step S7.

In step S7, the TMPB module 2 retrieves the accounting packet from the mirror buffer 4 and sends the accounting packet to the EMAP module 3. Thereafter, the EMAP module 3 sends the accounting packet via the recirculation port 5 to the IMAP module 1.

When it is determined that the incoming packet is the accounting packet, in step S8, the IMAP module 1 updates the value of the target FBU counter that corresponds to the target data flow by subtracting the packet size indicated by the accounting packet from the value of the target FBU counter, and updates the value of the PBU counter by subtracting the packet size indicated by the accounting packet from the value of the PBU counter. Then, the procedure flow proceeds to step S9.

In step S9, the IMAP module abandons the incoming packet.

When it is determined that one of the criteria is satisfied, in step S10, the SNAP module 3 generates a control frame, the type of which depends on the one of the criteria that is satisfied. Specifically, when the first condition is satisfied, the EMAP module 3 generates the first transmitted pause frame. When the second condition is satisfied, the EMAP module 3 generates the first transmitted resume frame. When the third condition is satisfied, the EMAP module 3 generates the second transmitted pause frame. When the fourth condition is satisfied, the SNAP module 3 generates the second transmitted resume frame. Then, the procedure flow proceeds to steps S11 and S12.

In step S11, the EMAP module 3 generates another control frame, the type of which depends on the one of the criteria that is satisfied. Specifically, when the first condition is satisfied, the EMAP module 3 generates the first transmitted migrate frame. When the second condition is satisfied, the EMAP module 3 generates the first transmitted migrate-back frame. When the third condition is satisfied, the EMAP module 3 generates, for each of the data flows that is to be controlled, the second transmitted migrate frame for each of at least one upstream node outputting the data flow. When the fourth condition is satisfied, the EMAP module 3 generates, for each of the data flows that is to be controlled, the second transmitted migrate-back frame for each of the at least one upstream node outputting the data flow. Then, the procedure flow proceeds to step S12.

In step S12, the EMAP module 3 sends the control frame thus generated to the at least one upstream node according to indication of the control frame thus generated. Specifically, the control frame generated in step 310 is sent to the at least one upstream node first, and then the control frame generated in step S11 is sent.

When it is determined that the incoming packet is the control frame, in step S13, the TMPB module 2 performs operations according to the control frame.

Specifically, when it is determined that the incoming packet is the first received pause frame, the TMPB module 2 stops dequeuing one of the PEQs that corresponds to an indicated one of the priority levels for an indicated pause duration.

When it is determined that the incoming packet is the received migrate frame, the TMPB module enqueues a to-be-forwarded packet that belongs to one of the data flows which corresponds to an indicated FID into one of the PEQs that corresponds to one of the priority levels which corresponds to the one of the data flows, rather than enqueuing the to-be-forwarded packet into the DEQ.

When it is determined that the incoming packet is the received resume frame, the TMPB module 2 resumes dequeuing one of the PEQs that corresponds to an indicated one of the priority levels until the one of the PEQs is empty, and then dequeues the DEQ.

When it is determined that the incoming packet is the received migrate-back frame, the TMPB module 2 enqueues into the DEQ a to-be-forwarded packet that belongs to one of the data flows which corresponds to an indicated FID, rather than enqueuing the to-be-forwarded packet into one of the PEQs.

When it is determined that the incoming packet is the second received pause frame, the TMPB module 2 stops dequeuing all of the DEQ and the PEQs respectively for corresponding indicated pause durations.

Then, the procedure flow proceeds to step S9 after step S13.

To sum up, the method according to the disclosure utilizes the DEQ and the PEQs that respectively correspond to different priority levels as buffers to temporarily store to-be-forwarded packets, wherein each of the to-be-forwarded packets belongs to one of multiple data flows. In addition, the method records buffer usage of the DEQ and the PEQs by using the FBU counters that respectively correspond to the data flows. Depending on a variety of conditions of usage recorded by the FBU counters, a transmitted pause frame, a transmitted migrate frame, a transmitted resume frame or a transmitted migrate-back frame is transmitted to at least one upstream node to manage transmission of to-be-forwarded packets of the data flows. Moreover, in response to receipt of a received pause frame, a received migrate frame, a received resume frame or a received migrate-back frame from at least one downstream node, corresponding operations are performed on the DEQ and the PEQs to control transmission of to-be-forwarded packets of the data flows. In this way, the method according to the disclosure may mitigate issues of packet losses. Moreover, since a per-flow flow control scheme is adopted, the method achieves effects of relatively higher link utilization and fairer resource allocation than the PFC scheme. Furthermore, the method according to the disclosure can be implemented by a network switch that supports the PFC scheme, and would not suffer from problems of congestion spreading and circular wait deadlock that occur in the PFC scheme.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A flow control method for managing data flows on a computer network, adapted to be implemented by a network device that is configured to process the data flows and that communicates with at least one upstream node and at least one downstream node, the network device receiving packets from the at least one upstream node and forwarding the packets to the at least one downstream node, each of the packets belonging to one of the data flows, the network device including a plurality of per-flow buffer usage (FBU) counters that respectively correspond to the data flows, a default egress queue (DEQ), and a plurality of pause egress queues (PEQs), the DEQ and the PEQs respectively corresponding to a plurality of priority levels, the flow control method comprising steps of:

for each of the FBU counters, repeatedly obtaining a value that is recorded by the FBU counter and that indicates a total of packet sizes of packets which belong to one of the data flows that corresponds to the FBU counter, which are enqueued into one of the DEQ and the PEQs and which are not yet transmitted to the at least one downstream node;

for each of the FBU counters, when it is determined that the value of the FBU counter is greater than a per-flow pause threshold, sending a first transmitted pause frame followed by a first transmitted migrate frame to one of the at least one upstream node that is outputting one of the data flows which corresponds to the FBU counter, the first transmitted migrate frame indicating a flow identifier (FID) that corresponds to the one of the data flows which corresponds to the FBU counter, the first transmitted pause frame indicating a first indicated one of the priority levels that corresponds to the one of the data flows which corresponds to the FBU counter, and a first pause duration that corresponds to the first indicated one of the priority levels;

when it is determined that an incoming packet received from the at least one downstream node is a first received pause frame, according to a second pause duration and a second indicated one of the priority levels indicated by the first received pause frame, stopping dequeuing one of the PEQs that corresponds to the second indicated one of the priority levels for the second pause duration;

when it is determined that an incoming packet received from the at least one downstream node is a first received migrate frame, according to an FID indicated by the first received migrate frame, enqueuing a to-be-forwarded packet that belongs to one of the data flows which corresponds to the FID indicated by the first received migrate frame into one of the PEQs that corresponds to one of the priority levels which corresponds to the one of the data flows that corresponds to the FID, rather than enqueuing the to-be-forwarded packet into the DEQ;

for each of the FBU counters, when it is determined that a previous value of the FBU counter was greater than the per-flow pause threshold and a current value of the FBU counter is smaller than a per-flow resume threshold, sending a first transmitted resume frame followed by a first transmitted migrate-back frame to one of the at least one upstream node that is outputting one of the data flows that corresponds to the FBU counter, the first transmitted resume frame indicating one of the priority levels that corresponds to the one of the data flows which corresponds to the FBU counter, the first transmitted migrate-back frame indicating an FID that corresponds to the one of the data flows which corresponds to the FBU counter;

when it is determined that an incoming packet received from the at least one downstream node is a first received resume frame that indicates one of the priority levels, resuming dequeuing one of the PEQs that corresponds to the one of the priority levels until the one of the PEQs is empty, and then dequeuing the DEQ; and when it is determined that an incoming packet received from the at least one downstream node is a first received migrate-back frame, according to an FID indicated by the first received migrate-back frame, enqueuing into the DEQ a to-be-forwarded packet that belongs to one of the data flows which corresponds to the FID indicated by the first received migrate-back frame, rather than enqueuing the to-be-forwarded packet into one of the PEQs.

2. The flow control method as claimed in claim 1, further comprising a step of:

for each of the FBU counters, when it is determined that the value of the FBU counter is not greater than the per-flow pause threshold, enqueuing into the DEQ a to-be-forwarded packet that belongs to one of the data flows which corresponds to the FBU counter.

3. The flow control method as claimed in claim 1, wherein each of the first transmitted pause frame and the first received pause frame indicates a plurality of pause durations that respectively correspond to the priority levels, and contains a class-enable vector that indicates a corresponding one of the first and second indicated ones of the priority levels.

4. The flow control method as claimed in claim 3, the network device further including a packet buffer usage (PBU) counter, the flow control method further comprising steps of:

obtaining a value that is recorded by the PBU counter and that indicates a total of packet sizes of packets enqueued;

when it is determined that the value of the PBU counter is greater than a system buffer pause threshold, sending a second transmitted pause frame followed by a plurality of second transmitted migrate frames to each of the at least one upstream node that is outputting the data flows, the second transmitted migrate frames indicating FIDs that correspond respectively to the data flows, the second transmitted pause frame indicating all of the priority levels and a plurality of first pause durations that respectively correspond to the priority levels;

when it is determined that a previous value of the PBU counter was greater than the system buffer pause threshold and a current value of the PBU counter is smaller than a system buffer resume threshold, sending a second transmitted resume frame followed by a plurality of second transmitted migrate-back frames to each of the at least one upstream node that is outputting the data flows, the second transmitted resume frame indicating the priority levels that correspond respectively to the data flows, the second transmitted migrate-back frames respectively indicating the FIDs of the data flows; and when it is determined that an incoming packet received from the at least one downstream node is a second received pause frame that indicates all of the priority levels and a plurality of second pause durations that respectively correspond to the priority levels, stopping dequeuing the DEQ and the PEQs respectively for the plurality of second pause durations that correspond respectively to the priority levels to which the DEQ and the PEQs respectively correspond.

5. The flow control method as claimed in claim 1, the network device being a network switch using P4 programming language, the network device further including an ingress match-action pipeline (IMAP) module and an egress match-action pipeline (EMAP) module, the flow control method further comprising:

the EMAP module generating and sending an accounting packet to the IMAP module;

when it is determined that an incoming packet is the accounting packet that indicates a packet size and an FID which corresponds to one of the data flows, the IMAP module updating a current value of one of the FBU counters that corresponds to the one of the data flows by subtracting the packet size indicated by the accounting packet from the value of the one of the FBU counters that corresponds to the one of the data flows, and updating a value of the PBU counter by subtracting the packet size indicated by the accounting packet from the value of the PBU counter; and when it is determined that an incoming packet is a to-be-forwarded packet, the IMAP module updating a value of one of the FBU counters that corresponds to a target one of the data flows to which the to-be-forwarded packet belongs by adding a packet size of the to-be-forwarded packet to the current value of the one of the FBU counters that corresponds to the target one of the data flows, and updating a value of the PBU counter by adding the packet size of the to-be-forwarded packet to the value of the PBU counter.

6. The flow control method as claimed in claim 5, the network device further including a mirror buffer, a recirculation port, and a traffic manager and packet buffer (TMPB) module that includes the DEQ and the PEQs, wherein the step of generating and sending an accounting packet includes:

whenever the EMAP module outputs a to-be-forwarded packet to the at least one downstream node, the EMAP module making a cloned copy of the to-be-forwarded packet thus outputted, truncating the cloned copy by removing packet payload of the cloned copy to obtain a truncated copy serving as the accounting packet, and storing the accounting packet in the mirror buffer, the accounting packet indicating a packet size of the to-be-forwarded packet thus outputted and an FID that corresponds to one of the data flows to which the to-be-forwarded packet thus outputted belongs;

the TMPB module retrieving the accounting packet from the mirror buffer and sending the accounting packet to the EMAP module; and the EMAP module sending the accounting packet via the recirculation port to the IMAP module.

7. The flow control method as claimed in claim 1, further comprising a step of:

determining, for an incoming packet, an FID of an incoming one of the data flows to which the incoming packet belongs by calculating, based on 5-tuple information contained in a header of the incoming packet, a hash value to serve as the FID, wherein the 5-tuple information includes a source IP address, a source port number, a destination IP address, a destination port number, and a value related to a protocol type.

8. The flow control method as claimed in claim 1, wherein:

each of the migrate frames contains data related to migration type for the network device to recognize the migrate frame; and for each of the migrate frames, the FID indicated by the migrate frame and the data related to migration type are represented by 16 bits of binary digits.

* * * * *